United States Patent [15] 3,645,148
Schrempp [45] Feb. 29, 1972

[54] SKEW AXIS GEARING

[72] Inventor: Ernst Schrempp, Norwalk, Conn.
[73] Assignee: Pitney-Bowes, Inc., Stamford, Conn.
[22] Filed: June 15, 1970
[21] Appl. No.: 46,402

[52] U.S. Cl. .............................................. 74/423, 74/425
[51] Int. Cl. ....................... F16h 1/14, F16h 1/16, F16h 1/20
[58] Field of Search ....................... 74/424.5, 423, 424, 425 X

[56] References Cited

UNITED STATES PATENTS 3,224,290 12/1965 Polydoris ............................. 74/424.5
3,038,346 6/1962 MacFarland ......................... 74/425 X
2,810,305 10/1957 Brinza et al. ........................ 74/423 UX Primary Examiner—Leonard H. Gerin
Attorney—William D. Soltow, Jr., Albert W. Scribner, Martin D. Wittstein and Louis A. Tirelli

[57] ABSTRACT

The disclosed skew axis gearing includes a face gear which is driven by a cylindrical pinion or worm gear having a constant lead throughout its axial length. The pinion teeth are of trapezoidal cross section and are symmetrical to a bisecting axis perpendicular to the pinion axis. Thus the pinion teeth have equal pressure angles.

3 Claims, 2 Drawing Figures

PATENTED FEB 29 1972

3,645,148

INVENTOR.
ERNST SCHREMPP
BY
Martin O. Wittstein
ATTORNEY

SKEW AXIS GEARING

BACKGROUND AND OBJECTS OF THE INVENTION

Skew axis gearing, sometimes termed hypoid gearing, refers to a pinion and face gear set wherein the gear axes are both nonparallel and nonintersecting. Gearing of this type is advantageous in applications calling for fairly high gear ratios with stringent space limitations. The gear set can be designed to transmit fairly high power with virtually no backlash. Recently, such skew axis gear sets have employed face gears molded of a suitable plastic, such as Delrin nylon, etc.

Heretofore, it has been considered necessary to give the gears a peculiar shape and/or tooth or thread profile in order to achieve sufficient as well as proper tooth engagement to transmit substantial power with minimum wear. Thus, crown or bevel gears have been proposed. The pinion or worm, in turn, has been formed with varying degrees of taper. Also, the tooth profiles have been given a variety of shapes calculated to transmit substantial power and to satisfy other requirements. All of these proposals have led to skew axis gear designs which are difficult and expensive to manufacture.

It is accordingly a general object of my invention to provide improved skew axis gearing of simplified design.

An additional object is to provide skew axis gearing of the above character which is inexpensive to manufacture using conventional techniques and equipment.

A further object is to provide skew axis gearing of the above character which is capable of transmitting substantial power over a long operating life and is conducive to large reduction ratios.

Another object is to provide skew axis gearing of the above character which is compact in size and thus capable of meeting stringent space limitations.

Other objects of my invention will in part be obvious and will in part appear hereinafter.

SUMMARY OF THE INVENTION

In accordance with the present invention, I provide skew axis gearing in which the pinion or worm gear is of an uniquely simplified design as compared to prior art skew axis pinions. As a consequence, the skew axis gearing of my invention is significantly less expensive to manufacture.

More specifically, the skew axis pinion gear does not have a tapered configuration, but in fact is essentially perfectly cylindrical. Thus, the pinion gear is essentially a worm or screw of constant lead. Moreover, the thread or tooth profile of the pinion is trapezoidal in cross section and is symmetrical about a bisecting axis perpendicular to the pinion axis. That is, the tooth profile has equal pressure angles. This greatly simplifies manufacture procedures using convention techniques and procedures well known in the art.

Simplification of the pinion design afforded by my invention also results in simplification of the face gear design required for conjugate action. As a result the face gear may be formed of plastic using a relatively inexpensive mold design.

I have found that the skew axis gearing of my invention is conductive to relatively large reduction ratios; for example 50:1, unlike typical prior art designs. Power transmission capabilities are found to be considerable, particularly in view of the compactness and tooth size of the subject gearing.

Moreover, the instant skew axis gearing is extremely efficient, quiet, and capable of long operating life. As an added benefit, the skew axis gearing of my invention, due to the equal pressure angles, is antioverhauling in the sense that when power is removed from the pinion, the face gear cannot effectively overtake and drive the pinion. Thus, the pinion effectively acts as a brake on the face gear shaft, the output shaft, when the pinion ceases to be driven. In many applications this is an essential feature and by using my design, separate output shaft braking provisions are unnecessary.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIG. 1 is a top plan view of a skew axis gear set constructed according to a preferred embodiment of my invention; and FIG. 2 is a fragmentary sectional view showing the tooth or thread profile of the pinion gear of FIG. 1.

DETAILED DESCRIPTION OF THE PREFERRED EMBODIMENT

Figure 1:
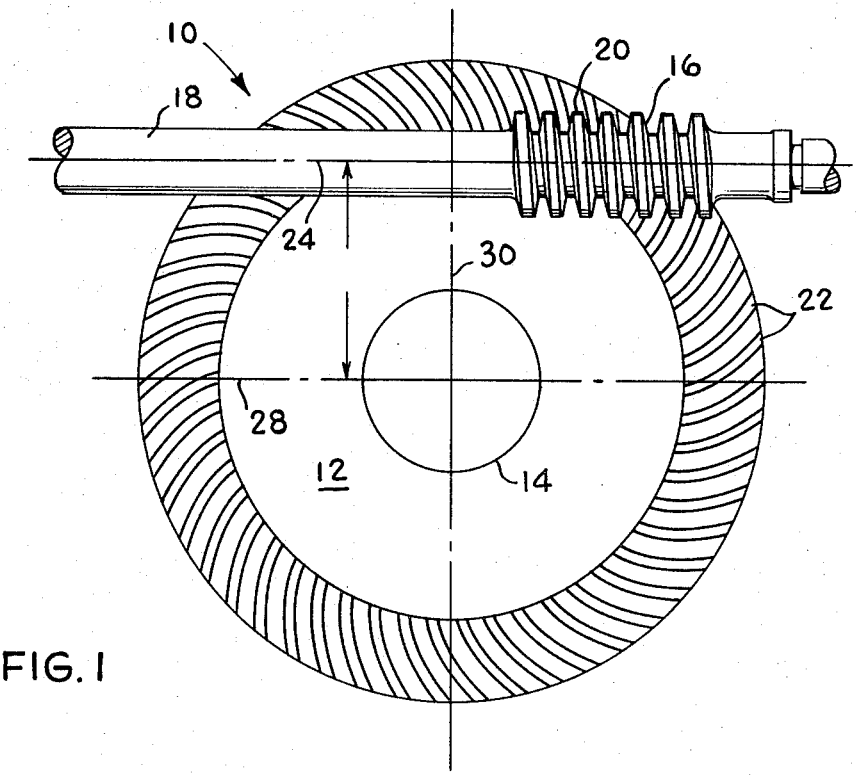

Referring now to the drawing, the skew axis gearing of the present invention, generally indicated at 10 in FIG. 1, comprises a face gear 12 secured on an output shaft 14 and a pinion or worm gear 16 integrally formed or otherwise secured on an input shaft 18. The input shaft is positioned at right angles to the output shaft and is offset therefrom so that the shafts do not intersect. The thread or threads (helical teeth) 20 of the pinion 16 mesh with teeth 22 of the face gear 12 as the pinion drives the face gear. It is seen that by virtue of the skew axis orientation, there are multiple teeth in meshing interengagement enabling the gear set to transmit substantial power.

Figure 2:
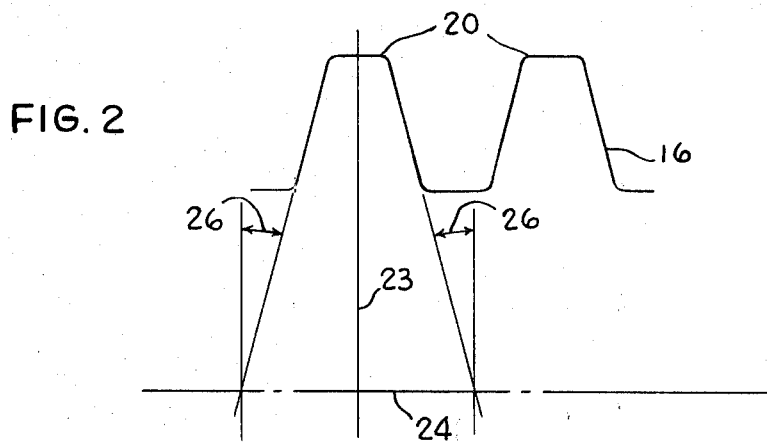

The pinion tooth or thread profile seen in the cross section of FIG. 2 is trapezoidal and is symmetrical about a bisecting axis 23 perpendicular to the pinion axis 24. The pressure angles 26 of the pinion 16 are equal and are preferably each established at the conventional hob angle of 14½° for ease of fabrication. Other hob angles may be employed, however.

The pinion is the primary element of the skew axis gear set and once it is designed the face gear design can be generated using conventional hobbing techniques. In accordance with my invention, the pinion is designed in accordance with the following formula:

$$L = 2\pi O / R,$$

where $L$ equals the pinion thread lead. $O$ is the magnitude of offset of the pinion axis 24 from the face gear horizontal axis 28 measured along the gear vertical axis 30 which is perpendicular to the pinion axis (FIG. 1). $R$ equals the desired gear or speed ratio or the ratio of the number of gear teeth 22 to the number of pinion threads 20. I have found that I can readily achieve reduction ratios of 50:1. I have also found that application of the above formula results in gear teeth after hobbing which are free of inactive fillets or undercuts. Thus the resulting face gear is of optimum design and strength for a given offset $O$ and gear ratio $R$. Consequently, the face gear may be and preferably is molded in a suitable plastic such as Delrin.

The skew axis gearing of my invention is exceptionally efficient in the driving direction, 70–75 percent for reduction ratios as high as 50:1, but is relatively inefficient in the driven direction. Thus the disclosed skew axis gear, due to the equal pressure angles, is essentially unidirectional. This apparent drawback is highly advantageous in certain applications where it is desired that the face gear be effectively incapable of overhauling or overtaking the pinion and thereby act as the driving member instead of the driven member. Thus in the gearing of my invention, when driving power is removed from the pinion, it then effectively acts as a brake on the face gear. Thus, use of the disclosed gearing in some applications can eliminate the need for a separate brake to inhibit further rotation of the gear shaft 14 after driving power has been removed from the pinion shaft 18.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desired to secure by Letters Patent is:

1. Skew axis gearing comprising, in combination;
   A. a face gear;
   B. a cylindrical pinion gear in meshing engagement with said face gear; and
   C. at least one helical thread of constant lead formed on said pinion gear, said thread having
      1. a trapezoidal profile which is symmetrical about a bisecting axis perpendicular to the axis of said pinion gear to provide equal pressure angles, and
      2. a lead determined in accordance with the formula:

$$L = 2\pi O/R$$

where $O$ equals the offset of the pinion gear axis from the face gear axis measured along an axis perpendicular to both gear axes, and $R$ equals the gear ratio or the ratio of the number of face gear teeth to the number of pinion threads.

2. The skew axis gearing defined in claim 1, wherein the thread pressure angles are each 14½°.

3. The skew axis gearing defined in claim 1, wherein said face gear is formed of molded plastic.

* * * * *